United States Patent [19]
Kuczewski

[11] Patent Number: 5,868,575
[45] Date of Patent: Feb. 9, 1999

[54] COOPERATIVE/INTERACTIVE LEARNING SYSTEM FOR LOGIC INSTRUCTION

[76] Inventor: Robert M. Kuczewski, 8268 Gilman Dr. #9, La Jolla, Calif. 92037

[21] Appl. No.: 650,480

[22] Filed: May 20, 1996

[51] Int. Cl.[6] .................................................. G09B 19/00
[52] U.S. Cl. ......................... 434/118; 434/224; 434/365; 395/500; 364/578; 706/927
[58] Field of Search ..................... 434/118, 219, 434/224, 307 R, 308, 365, 379; 395/500, 927; 364/578, 800–802; 345/326, 950; 706/927

[56] References Cited

U.S. PATENT DOCUMENTS

| | | | |
|---|---|---|---|
| 3,372,381 | 3/1968 | Raspanti | 434/118 X |
| 3,410,001 | 11/1968 | Blum | 434/118 |
| 3,540,135 | 11/1970 | Alcosser et al. | 434/118 |
| 3,694,931 | 10/1972 | Bialek | 434/118 |
| 3,844,564 | 10/1974 | Barish | 434/118 X |
| 3,881,260 | 5/1975 | Hombs | 434/118 |
| 3,975,836 | 8/1976 | Broder | 434/118 |
| 4,259,077 | 3/1981 | Keweza | 434/118 |
| 4,306,286 | 12/1981 | Cocke et al. | 395/500 |
| 4,656,580 | 4/1987 | Hitchcock, Sr. et al. | 395/500 |
| 4,964,803 | 10/1990 | Chul | 434/118 |
| 5,213,506 | 5/1993 | Lapsa et al. | 434/118 |
| 5,276,854 | 1/1994 | Court et al. | 395/500 |
| 5,441,415 | 8/1995 | Lee et al. | 434/118 X |
| 5,562,454 | 10/1996 | Kanazki et al. | 434/219 |

*Primary Examiner*—Joe H. Cheng

[57] ABSTRACT

A cooperative, interactive computer logic instruction system is disclosed in which students participate by performing individual gate and component functions. These functions are linked together by connections carrying power, ground, and signals to form a cooperative logic system distributed over the entire class. Individual components range from gates and other low-level electronics up through larger scale devices and computer components. An important aspect of this invention is that each student linked in the system must actually perform the assigned function themselves in order to generate the proper output which then feeds as input to other students in the system. In this manner, entire logic circuits, computers, and networks may be modeled and understood. In addition to the manual mode described above, each component also supports an automatic mode for demonstration, error checking, and completion of circuits not exactly suited to the particular number of students in a given classroom situation.

7 Claims, 7 Drawing Sheets

Fig. 8
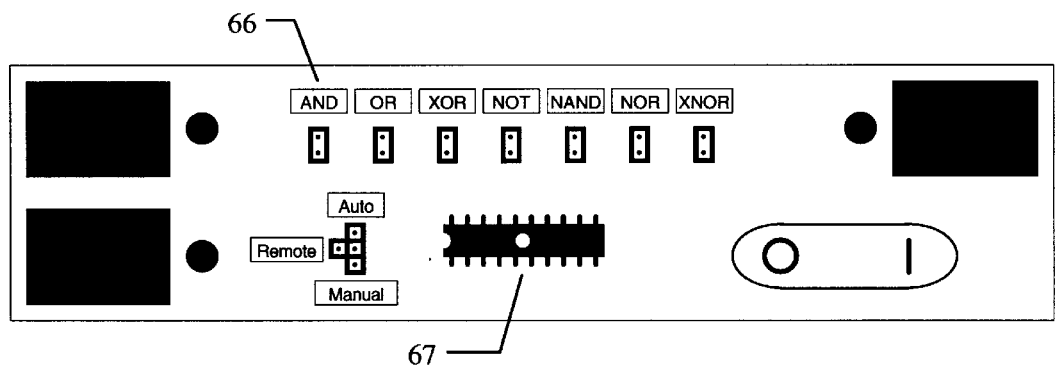
Fig. 9
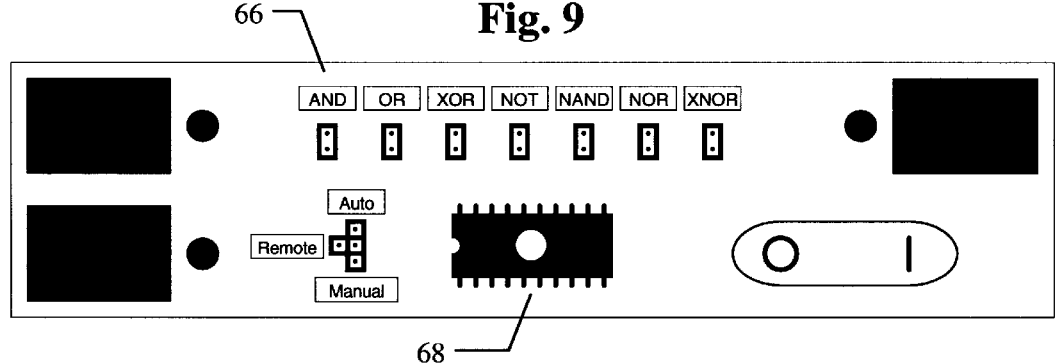
Fig. 10
| Inputs | | | | Outputs | | | | | |
|---|---|---|---|---|---|---|---|---|---|
| Auto | Switch | A | B | AND | OR | NAND | NOR | XOR | XNOR |
| 0 | 0 | X | X | 0 | 0 | 0 | 0 | 0 | 0 |
| 0 | 1 | X | X | 1 | 1 | 1 | 1 | 1 | 1 |
| 1 | X | 0 | 0 | 0 | 0 | 1 | 1 | 0 | 1 |
| 1 | X | 0 | 1 | 0 | 1 | 1 | 0 | 1 | 0 |
| 1 | X | 1 | 0 | 0 | 1 | 1 | 0 | 1 | 0 |
| 1 | X | 1 | 1 | 1 | 1 | 0 | 0 | 0 | 1 |

COOPERATIVE/INTERACTIVE LEARNING SYSTEM FOR LOGIC INSTRUCTION

BACKGROUND-FIELD OF THE INVENTION

This invention relates to electronic and logic instructional aids, specifically to devices that allow students to construct and interact with binary logic circuits.

BACKGROUND-DISCUSSION OF PRIOR ART

Numerous educational devices and methods have been proposed for teaching digital logic circuits at various levels of complexity. These vary from individual experimentation units to classroom display units. The former are geared toward self-paced hands-on learning, while the latter are designed as lecturing aids. While both of these techniques have their place in a classroom situation, neither takes advantage of the natural human predisposition toward social interaction. The device in U.S. Pat. No. 3,694,931 to Bialek, 1972 Oct. 3, for example, is typical of the individual experimentation variety. It is a desktop device designed to be used by a single student in the construction of a logic circuit. U.S. Pat. No. 4,259,077 to Keweza, 1981 Mar. 31 describes a similar device with advantages of using a digital computer to perform the training. U.S. Pat. No. 5,213,506 to Lapsa et al. describes a gravitationally based device for demonistrating binary operations. But again, it is a stand alone device well suited to a classroom demonstration. It does not utilize the intrinsic social nature of human students. Finally, there are inventions which utilize computers as self-paced audio-visual learning machines. U.S. Pat. No. 5,441,415 to Lee et al., 1995 Aug. 15, illustrates this approach which amounts to putting a networked computer workstation on every student's desk. Aside from the obvious expense of this approach, it also fails to address the participatory interaction between students. It focuses specifically on "self-paced" learning which tends to fracture and divide the classroom rather than unite it.

OBJECTS AND ADVANTAGES

Accordingly, one of the principle advantages of the present invention is the participatory nature of the instructional system. Using this invention, the instructor will enlist the participation of every student in order to demonstrate a selected circuit. Each student will be given a device which is networked to all other devices in the system. Students will first learn to simulate their assigned devices and then to understand how their device functions within the larger circuit. The advantages of this kind of cooperative and interactive learning have been demonstrated in other kinds of role-playing learning, but prior to the current inventions these same advantages have been difficult to achieve in the area of computer logic training. This invention brings these advantages to this ever more important field. An unexpected advantage of this approach is that logic learning can be successfully attempted with students at a much earlier age than traditionally thought. This invention has been demonstrated to provide stimulating instruction to children as young as 8. In this case, the logic tasks were presented as a participatory game and they were enthusiastically learned and remembered. Another unexpected advantage of this system is that it may be used to demonstrate the operation of non-electronic systems. Examples include physical systems, economic systems, and even social systems.

Another advantage of the present invention is it's strong "hands-on" aspect. In an age where computers are performing visual miracles on demand, it is easy for students to become desensitized to what flashes by them on the screen. It all becomes "computer magic". The present invention is designed to cut through that magic by focusing on the simple hardware building blocks which form the basis of all modern digital computers. It provides a physical representation of what would otherwise be an abstract concept. This physical embodiment also enables the student to learn through multi-sensory pathways like sight, sound, and touch. It is almost as if the student is able to see, hear, feel. and affect the actual operation of digital logic circuits within a computer. The student becomes a part of the computer circuit itself. The advantages to this kind of participatory learning are well known and dramatic.

In addition to teaching the target subject matter, this invention also promotes cooperation. The invention illustrates that the performance of local functions can have global results. It also demonstrates that larger and more complex tasks can be performed by many individuals performing smaller and simpler tasks. In today's society, these lessons may equal or exceed the value of the computer logic being taught.

Further objects and advantages of my invention will become apparent from a consideration of the drawings and ensuing descriptions.

DESCRIPTION OF DRAWINGS

FIG. 8 shows an alternative implementation of a single logic gate using a PLA or PAL device.

FIG. 9 shows an alternative implementation of a single logic gate using a PROM or EPROM.

FIG. 10 shows a table of logic that might be used to implement the gates in FIGS. 8 and 9.

LIST OF REFERENCE NUMERALS

Figure 1:
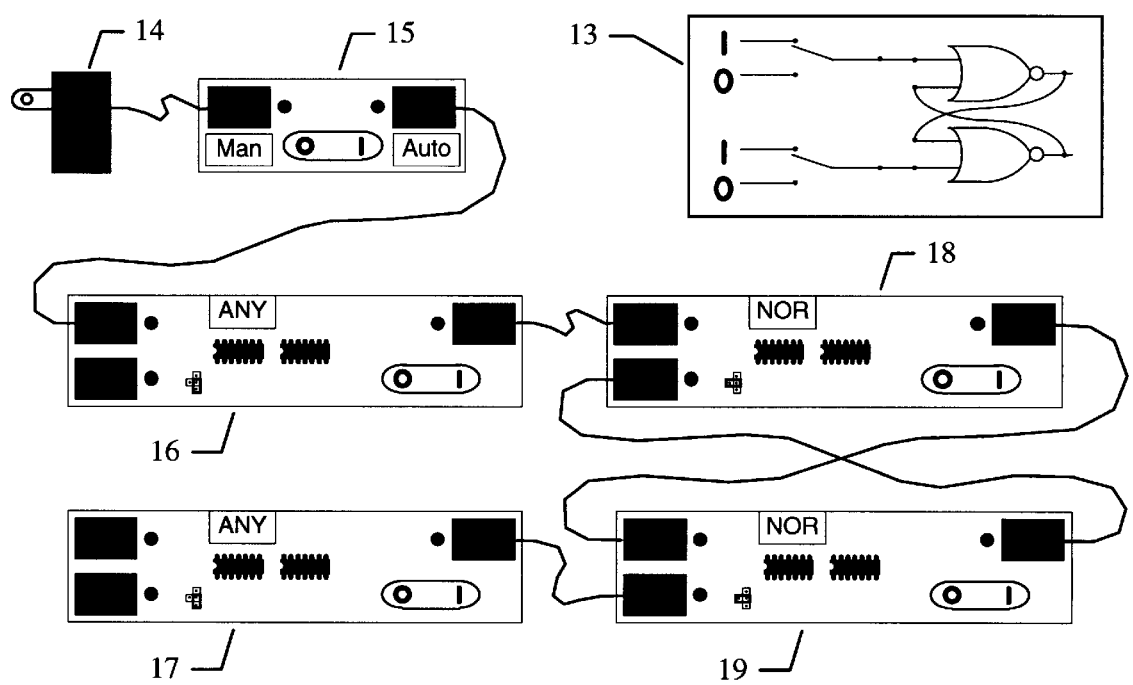
FIG. 1 shows a plan view of an implementation of my invention demonstrating a flip-flop.

1. Refers to FIG. 1
2. Refers to FIG. 2
3. Refers to FIG. 3
4. Refers to FIG. 4
5. Refers to FIG. 5
6. Refers to FIG. 6
7. Refers to FIG. 7
8. Refers to FIG. 8
9. Refers to FIG. 9
10. Refers to FIG. 10
11. Refers to FIG. 11
12. Refers to FIG. 12

13. NOR Flip-Flop Instructional Diagram
14. Power Adapter (AC to DC)
15. Master Control Device
16. Logic Gate Device as a "Set" Input of an RS Flip-Flop
17. Logic Gate Device as a "Reset" Input of an RS Flip-Flop
18. Logic Gate Device as "Not Q" half of a NOR Flip-Flop
19. Logic Gate Device as "Q" half of a NOR Flip-Flop
20. Power Cord
21. Power Jack
22. Power LED
23. Manual/Auto Switch
24. Manual/Auto LED
25. Output Connector
26. Connector Wire
27. Connector Body
28. Connector Spare Lead 1
29. Connector Power Lead
30. Connector Signal Lead
31. Connector Auto Lead
32. Connector Ground Lead
33. Connector Sparc Lead 2
34. Input A Port
35. Input B Port
36. Input A LED
37. Input B LED
38. Auto/ManLual Jumper Block
39. Logic Function Chip
40. NAND Chip
41. Logic Function Switch
42. Output LED
43. Output Port
44. Alternate Logic Function Chips
45. Switch Signal
46. Auto Signal
47. Input A Signal
48. Input B Signal
49. Logic Function Gate
50. Output Signal
51. Input A Base Resistor
52. Input B Base Resistor
53. Input A PNP Transistor
54. Input B PNP Transistor
55. Input A Emitter Resistor
56. Input B Emitter Resistor
57. NAND Gate (¼ of 4011)
58. Default Jumper Resistor
59. Auto Jumper Pin
60. Manual Jumper Pin
61. Output Base Resistor
62. Output NPN Transistor
63. Output Collector Resistor
64. Power (nominally +5 V)
65. Ground
66. Function Selection Jumpers
67. PLA Chip
68. PROM/EPROM Chip
69. Broadcast Media
70. Logic Gate Device
71. Adder Lowest Bit
72. Adder Higher Bits
73. Logic Gate Device Configured as an Input
74. Logic Gate Device Configured as an Output
75. Carry Output Signal
76. Carry Input Signal

SUMMARY OF THE INVENTION

This invention forms the basis of a continuing instructional program on computer architecture starting at the transistor and gate level and progressing upward until entire computers and even networks of computers arc built. At each additional level of complexity, two fundamental notions are maintained. First. students must always be required to participate by simulating the function of the component that they are assigned. Second, students must observe how their assigned component interacts with and affects the larger system. These two notions greatly enhance the effectiveness of the training because it appeals to the experimental and social natures of humans.

The invention itself provides a mechanism for involving students in classroom level logic circuits through a network of interconnected devices. Each device can be operated manually by its assigned student, or operate automatically according to its internal programming. In this way students can participate directly in the circuit.

Interconnections between these devices are accomplished by inexpensive telephone-type wires and connectors or a similar means. These telephone-type wires typically hold 4 to 8 conductors and are well suited to carry the power, ground, and signal connections needed for classroom-level circuits. Depending on the specific implementation, these connections could physically represent the system connections directly, or provide a broadcast media for implementing an arbitrary connection topology. In the former implementation, each logical connection would be represented by a physical wire. In the latter implementation all of the devices would share a common broadcast media, and the individual connections would be sent as addressed information packets. This latter version is appropriate for implementation on a set of networked computers which could also display the global and/or local states of the system. In either implementation, a key aspect is the real-time interaction of the students compromising the system.

The specific implementations discussed in this patent focus on the use of the invention for building and demonstrating common logic circuits. While this is all important application of the invention, it is not intended as a limitation of its usefulness. Indeed, the system of interconnected devices could he used to demonstrate all kinds of physical and non-physical systems in an interactive classroom environment. Examples include, but are not limited to: computer systems, electronic systems, physical systems. economic systems, ecological systems, and even biological/social systems. In these contexts, the invention provides a means of connecting the components of a system which are then role-played by the participating students. Some of these examples are Illustrated in the "Operation of the Invention" section.

DESCRIPTION OF THE INVENTION

As described above (and in the CLAIMS section below), this invention covers a range of educational devices which are designed to operate together in order to demonstrate the functioning of various electronic and computing systems. While the systems being simulated may range from low level logic circuits up to full computer systems, the means of simulation share common functionality. In particular, each such simulation consists of numerous interconnected subcomponents each of which can be manually operated by a single student who can then observe the resulting effect on system behavior. While the following discussion describes the invention within the context of a gate-level simulation, it does not limit the invention to that narrow domain.

A gate-level embodiment of this invention consists of individual instructional devices which operate as logic gates and are connected together to form a larger circuit. In this implementation, each device contains an input port for each signal that it receives from other devices, and an output port for each unique signal that it produces. In the case of a simple two-input AND gate, the device would contain two input ports and one output port. In this configuration, the logic device would typically have a visual indicator of some type to show the signal level at the inputs and outputs.

For simplicity of description, only 2-input, single output devices will be described. FIG. 1 shows a high-level system diagram consisting of 4 such devices 16–19, a master control device 15, a power supply 14, and an instructional diagram 13. This particular arrangement of devices demonstrates an RS flip-flop as shown in the instructional diagram 13 of the figure. The individual operation of these devices will be detailed in subsequent paragraphs. DC power is provided to the system by a typical AC-DC converter 14. This power is passed into the master control device 15 where the operational mode (either Manual or Automatic) is selected. The output of the master control device then provides power, ground, and mode selection signals to the remainder of the system. In FIG. 1 the master control device is connected to logic device 16 which functions as the "Set" input switch of the RS flip-flop being simulated. Logic device 17 functions as the "Reset" input switch. Logic devices 18 and 19 act as cross-coupled NOR gates which are the RS flip-flop itself. Device 18 also provides the inverted output of the flip-flop, while device 19 provides the non-inverted output.

Figure 2:
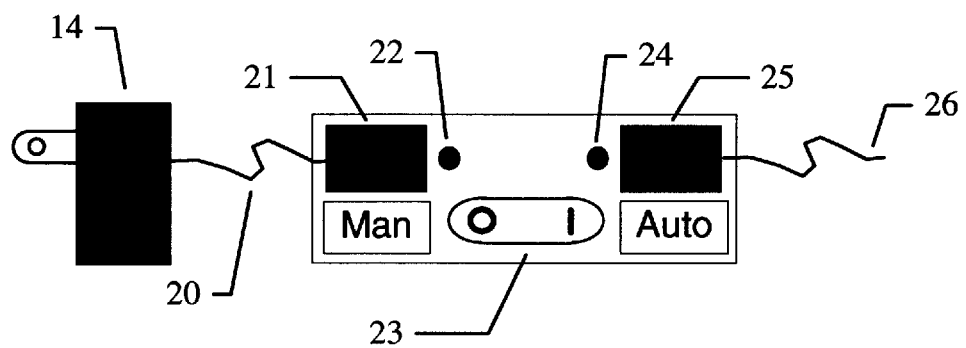
FIG. 2 shows a plan view of the master control and power supply components.

FIG. 2 shows the power supply and master control devices in more detail. The AC-DC converter 14 is connected to the master control by a typical power wire 20 which plugs into a power jack 21 on the master control device. LED 22 indicates that power has been applied. The master control device contains a switch 23 which controls the manual/automatic operation of the system. The position of this switch is reflected in an LED 24 which lights when the switch is in the automatic position. The output of the master control unit is distributed to the rest of the system through output socket 25 and connector wire 26. The signals contained in this wire are described in the next paragraph.

Figure 3:
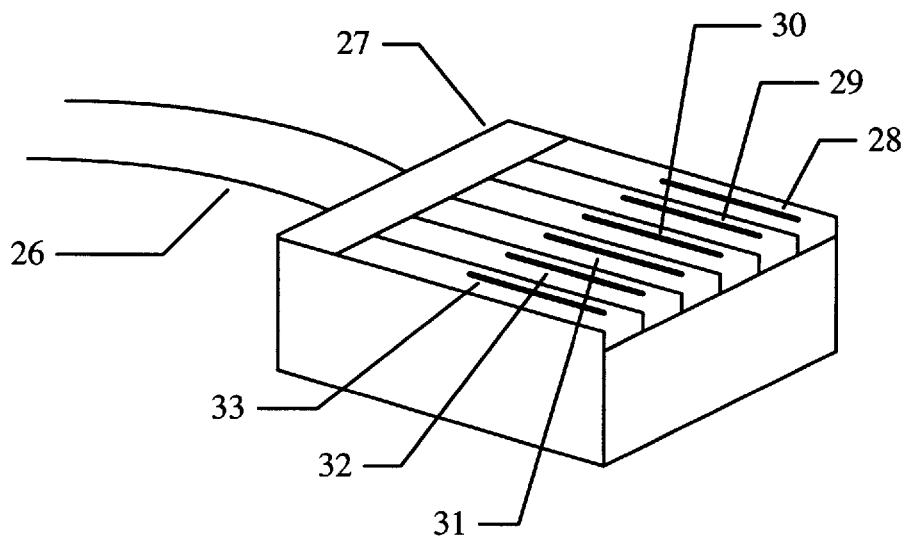
FIG. 3 shows the connector pin assignments used in the implementation.

FIG. 3 shows a connector and wire of the type used to join all devices in the system (excluding the AC-DC converter). This preferred implementation uses connectors and wire similar to those used in home telephone wiring and office network wiring, but any wire and connector carrying the proper number of leads may be used. Connector wire 26 carries the multiple leads between connectors located at its ends. In this drawing, connector body 27 holds 6 leads. These leads are defined as follows. Lead 28 is a spare and is reserved for future expansion. Lead 29 carries the power (typically +5 volts) to all boards connected to the system. Lead 30 carries the output signal from one device to another. Lead 31 carries the Auto/Manual signal to all boards connected to the system. Lead 32 carries the ground to all boards in the system. Lead 33 is also a spare reserved for future expansion. Note that while telephone type connectors and wire may be used. they must be configured for conventional data transmission. Specifically, each end of the wire must map the same signals to the same connector positions as defined above. Note also that a wire as defined here can have 2 or more connector ends. An example of a 3 connector wire would be a "Y" configturation. In this case each of the three connectors would be wired as described above. This kind of a "Y" could connect the output of one device to the inputs of two other devices and is common in most circuits. Wires of this type could he constructed with any number of ends to accomplish arbitrary circuit designs. Additionally, commercially available "T" connectors, and other multiple input/output connectors could be used to for joining wires and devices.

Figure 4:
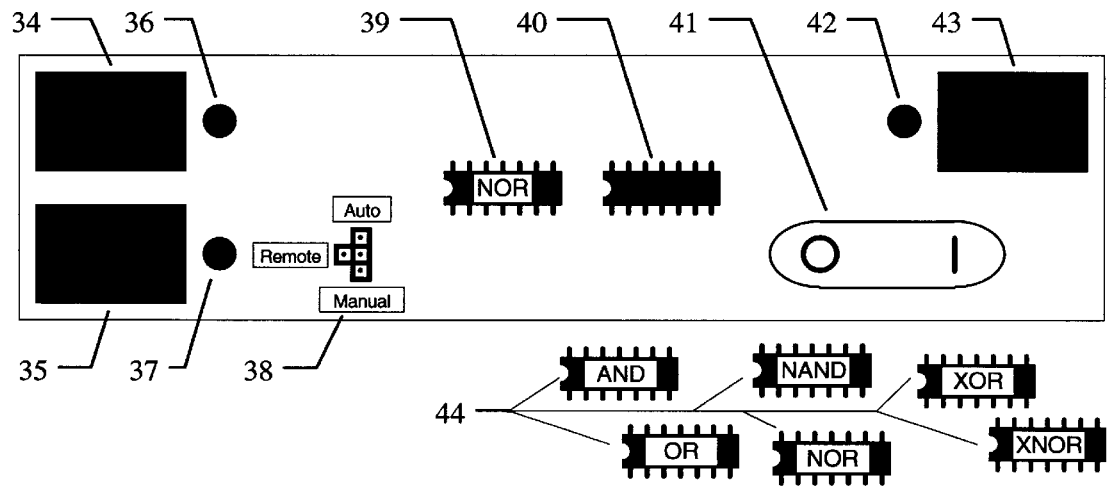
FIG. 4 shows a detailed drawing of a single logic gate as it might be implemented.

FIG. 4 shows an implementation of a logic device. The device itself is a standard circuit board of approximately 2 inches by 6 inches containing a number of components. It contains two input sockets for two signals A and B. These sockets accept the connectors shown in FIG. 3. A socket 34 accepts the A signal connector, and a socket 35 accepts the B signal connector. An LED 36 shows the state of the A signal, and an LED 37 shows the state of the B signal. These LED's are off when a logical 0 is input and on when a logical 1 is input.

The logic device of FIG. 4 also contains an Auto/Manual/Remote jumper block shown as 38. As its name suggests, this jumper block allows the device to be placed in one of three operational modes: Auto, Manual, and Remote. These modes control how the output of the device is determined and will be discussed later in the operational description. The jumper block itself consists of 4 pins arranged as shown so that a two pin jumper can be placed between the center pin and either of the three peripheral pins thereby making a connection and selecting a mode.

The logic device of FIG. 4 also contains a functional logic chip shown as 39. This socketed chip determines the output of the device when in Automatic mode. The functional logic chip is attached to the board via a standard socket so that it may be removed and replaced with other functional logic chips shown as 44. In this implementation, the logic chips are from the CMOS 4000 series, such as the 4001 NOR and the 4011 NAND. The only requirement on these chips is that they have identical pin definitions so that they will be "plug compatible".

The logic device of FIG. 4 also contains a Quad 2-input NAND chip shown as 40. This chip is used to compute the output of the device based on the operational mode, the results of the functional logic chip. and the position of a two-position switch shown as 41. An LED 42 indicates the state of the output. This LED is on for a logical 1 and off for a logical 0.

The logic device of FIG. 4 also contains an output port of socket shown as 43. This output socket accepts the same connectors shown in FIG. 3. Ad is wired such that it will pass the same signals on the same pin positions as the input sockets 34 and 35. This arrangement of sockets and wires as previously described ensures that any end of any wire can be plugged into any socket and still properly pass the power, ground, and auto signals which are the same throughout the network of devices. The only signal level which differs front device to device is the Signal Lead 30 as shown in FIG. 3. More detailed explanation will later explain how built in circuitry protects the devices in the event that two mismatched outputs are inadvertently wired together.

Figure 5:
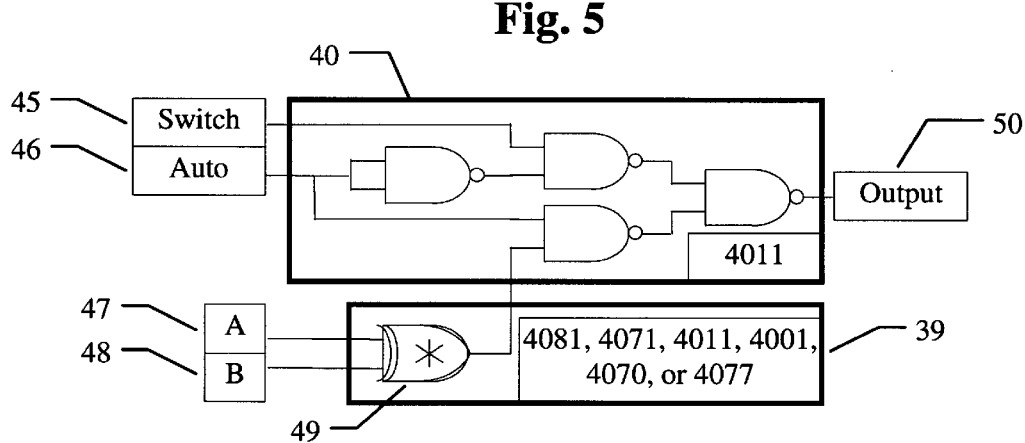
FIG. 5 shows the digital logic that might be used to implement the gate of FIG. 4.

FIG. 5 shows the logical wiring of the two chips 39 and 40. As shown in the lower half of the figure, the two logical input signals A (47) and B (48) are passed through a single logic gate 49 of the four typically available in chip 39. Since this gate can be any of several depending on which functional chip is inserted it is drawn as an amalgamation of different gates and displays a star or asterisk (*). This convention will be used in all subsequent drawings of this functional gate to indicate its generic nature.

The upper half of FIG. 5 shows how the result of logic gate 49 is combined with the Switch signal 45 and the Auto signal 46. This combination of signals is performed by the four NAND gates of the 4011 chip 40 as shown. The result of this logic drives the output LED 42 and the signal lead 30 of output port 43.

Figure 6:
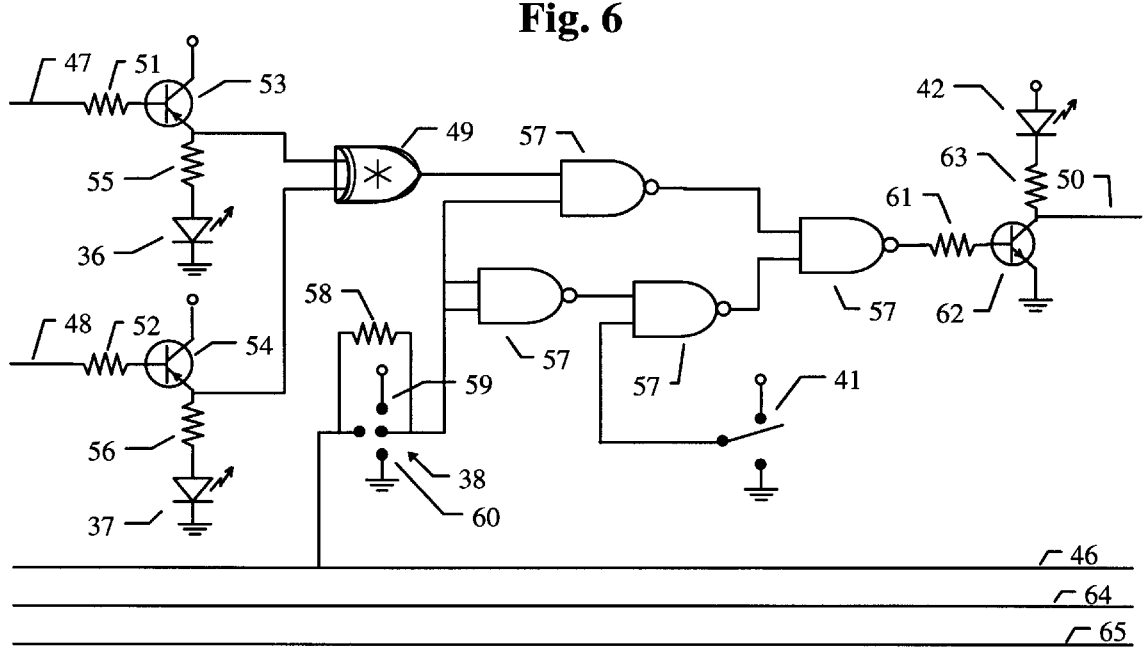
FIG. 6 shows a detailed schematic that might be used to implement the gate of FIG. 4.

FIG. 6 shows a schematic of a single logic device. The two input signals 47 and 48 are routed through base resistors 51 and 52 (typically 20kΩ each). The base resistors are in turn connected to two PNP transistors 53 and 54. Each of these transistors is configured with emitter resistors 55 and 56 (typically 2kΩ each) to act as switches for the input LED's 36 and 37. The emitter outputs of these two transistors provide the logical inputs to the functional gate 49. The output of gate 49 provides input to the NAND gates 57 which are contained in the NAND chip 40. The local auto signal from jumper block 38 is also routed into the NAND gates as shown. In this diagram, a high valued resistor 58 (typically around 1MΩ) is connected between the global auto/manual signal 46 and the local auto signal routed into the NAND gates. This provides a "default" connection in case no jumper is present. The other two pins of jumper block 38 allow connection of the local auto signal to either a power pin 59 for forced local auto mode or to a ground pin 60 for forced local manual mode. Switch 41 is also routed through the NAND gate logic as shown in the figure. The result of the NAND gate logic drives an NPN transistor 62 through a base resistor 61 (typically 20kΩ). Transistor 62 then drives LED 42 through resistor 63 (typically 2kΩ). The collector output of transistor 62 also drives output signal 50 found in output socket 43. Since the output signal 50 is pulled down through resistor 63 by transistor 62, inadvertently connecting two dissimilar outputs will at most double the current draw and not damage either device. FIG. 6 also indicates that the global auto/manual signal 46, the power signal 64, and the ground signal 65 are routed through all three sockets as described above.

Figure 7:
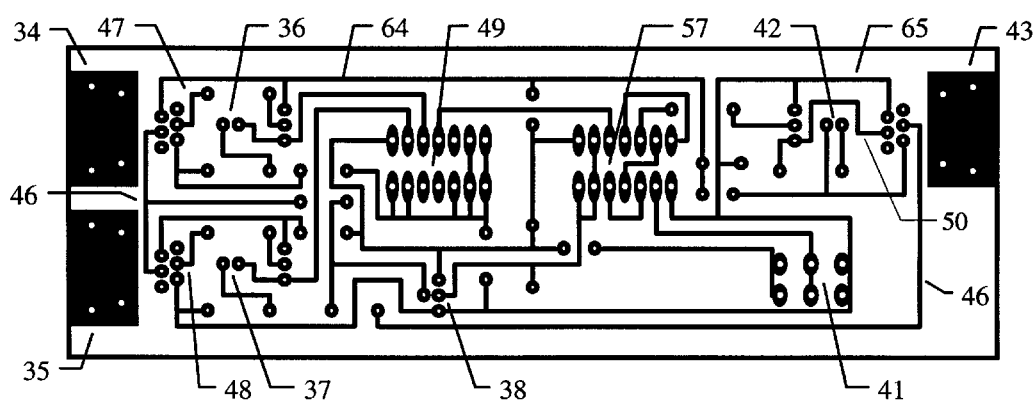
FIG. 7 shows a circuit board design that might be used to implement the gate of FIG. 4.

FIG. 7 shows the top view of a board mask used to construct a functioning logic gate device. The location of important components and signals are indicated with the same reference numbers as used in previous figures. This particular board mask also contains provisions for power capacitors as needed.

Alternative Implementations

FIG. 8 and FIG. 9 show alternative implementations of the logic device described above. The principle distinction of these implementations is that the logic for both chips 39 and 40 are combined into programmed chips. Aside from reducing the part count, the use of programmed chips enables the inclusion of many functional gates within the same physical device thereby eliminating the need for alternate function chips 44. Instead, these alternate functions can be jumper or switch selected. Jumpers 66 illustrate this capability for the standard logic gates. In FIG. 8 a Programmed logic Array (PLA PAL, or GAL) 67 replaces the two logic chips, and in FIG. 9 a Programmable Read Only Memory (PROM, EPROM, or EEPROM) 68 replaces the same logic chips. The truth table of FIG. 10 shows the mapping of input conditions to output for 6 different logical gates (AND, OR, NAND, NOR, XOR, and XNOR). The logical NOT function is mapped to the NOR gate with the unused input allowed to float off (a natural result of the input transistor logic). The jumper selectable truth table is easily programmed into these devices using several approaches. One approach is to treat each input and the function selection jumper as a combined address which refers to a single output bit. Another approach is to use the 4 inputs as addresses, and then store multiple output bits at each address. The selection of the output bit is made through the function selection jumpers 66. Either approach is acceptable and others may also be employed depending on the capabilities of the programmable device used.

Figure 11:
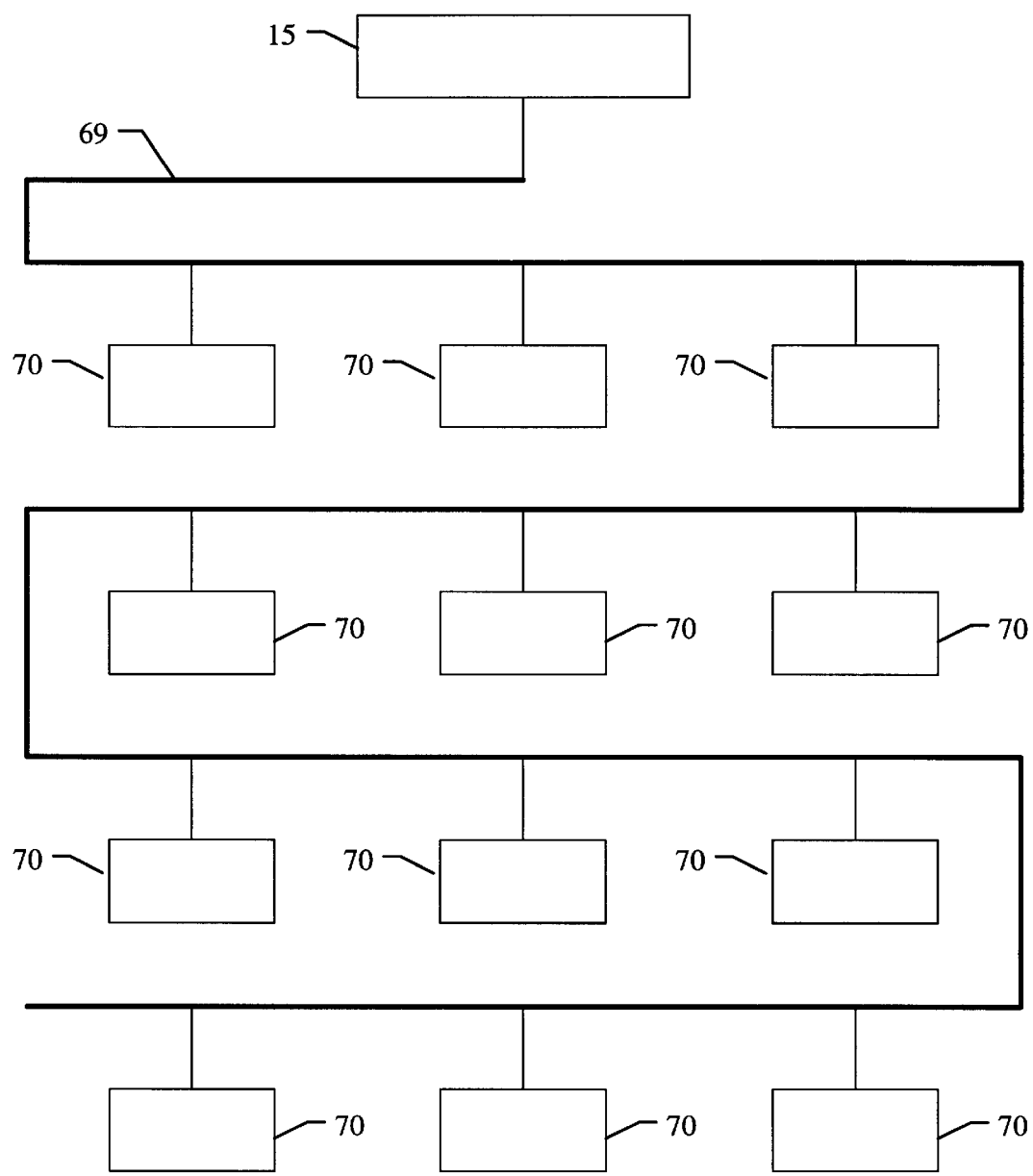
FIG. 11 shows an implementation of the learning system using a broadcast architecture.

FIG. 11 shows an alternative embodiment of the invention using a broadcast communication architecture. In this implementation, a broadcast medium 69 is used to broadcast the signals between each device 70 including the master control device 15. In this implementation each device is additionally equipped with address broadcasting circuitry and address decoding circuitry. This enables each device to communicate directly with every other device in the system.

While the invention has been shown and described in the form of its preferred and alternative embodiments, it is understood that many changes in its form and detail may be made without departing from the spirit and scope of the invention.

OPERATIONAL EFFECT OF DEVICE IMPLEMENTATION

As described above, the logic of a single gate device may be implemented in one of two ways. It may be implemented directly using two standard integrated circuits (ICs or "chips"). One of these chips is used to decode the Auto and Switch inputs while the other is a plug-replaceable IC which defines the automatic operation of the device. The other implementation uses a single programmed logic device which does the job of both chips. In addition, most programmed devices have the capacity to store the input-output functionality for a number of gate definitions which may be jumper or switch selected.

The choice between these two implementations is a choice between clarity and convenience. With the two chip approach, the function of the device is clearly selected by inserting a chip of the same function into the socket. For example, an AND device may be obtained by using a Quad 2-input AND gate IC (CMOS 4081). Similarly a NOR device may be produced by using a Quad 2-input NOR gate IC (CMOS 4001). This approach has educational value because it clearly matches the function of the device with the actual part number that performs that function. It also introduces a little more hands-on activity to the process which makes the results that much more "real" to the students. The disadvantage to this approach is that it requires the insertion and extraction of a socketed IC to switch the functionality of a particular device. This insertion and extraction can cost in both time and breakage. This approach also requires a surplus of ICs to account for the various configurations needed for instruction. These disadvantages are overcome in the programmed device which uses a simple jumper or switch to select the functionality without the need for any additional parts. The disadvantage in this case is that a programmed device obscures the relationship between the logical function of the device and its chip-level embodiment. For all of these reasons, the preferred implementation for an instructional kit should contain a mix of both kinds of devices.

To simplify all subsequent operational descriptions, the difference between these two implementations (replaceable chip versus programmed logic) will be ignored. Instead of specifying whether a logic function is chosen via a chip or a jumper, the following descriptions will simply indicate that a logic function is chosen or selected. The details of this "choice" or "selection" are understood to be dependent on the device implementation as described above. Beyond the act of changing the chip or jumper, this difference has no other operational impact thereby justifying its omission in the operational discussion.

OPERATION OF THE INVENTION

As indicated earlier, this invention is a system of participatory building blocks that may be used to construct an infinite number of circuits. Accordingly. the operational description of this system can best be described through several examples of its use which will be given below. But first some general features of its operation will be discussed to provide a basis for the more detailed examples.

The use of this invention will typically occur in a classroom or other group learning environment. In this typical environment, each student is given a single device to operate. The instructor then draws a diagram of the circuit to be studied, and the students use wires and connectors to interconnect the devices to form that circuit. The instructor may assist the students in this task. At some point the instructor may apply power to the network of devices by connecting the single master control device into any one of the student's devices. The system is designed so that the master control device may be plugged into either an input port or an output port with the same effect. The system is also designed to tolerate the inadvertent connection of multiple outputs which is likely to occur in learning environments.

In addition to providing power. the master control device also globally selects the Manual/Automatic operation of those devices jumpered in the "Remote" mode (see FIG. 4). In this way, the instructor may use the master control device to check the operation of the circuit in either manual or automatic modes. The logic devices themselves are also constructed so that the "Remote" mode is selected when no jumpers are present. The jumpers themselves can be used to override the master control and force individual devices into either fully manual or fully automatic modes.

FIG. 1 provides a good first example of the overall system operation. The instructional diagram 13 shows the circuit to be demonstrated (an RS flip-flop in this example). The diagram itself could be drawn on the board. distributed as a hand-out, or even drawn on a large paper diagram to be used as a wiring template on the classroom floor. As shown in the figure. this example requires 4 logic devices 16, 17, 18, and 19. Devices 16 and 17 form the "Set" and "Reset" inputs to the RS flip-flop. Devices 18 and 19 form the RS flip-flop itself.

As shown in the instructional diagram, the "Set" and "Reset" devices ( 16 and 17) really act as switches which may be either on or off. This provides a good example of where the manual mode of operation should be used. By placing these two devices in the Manual mode, their outputs will directly reflect their switch settings regardless of their inputs and regardless of their function selections. This is the definition of manual mode and is indicated on the diagram by the jumper in the lower position (see FIG. 4 for labels). The circuitry of these devices ensures that a manual jumper selection will keep the devices in manual mode regardless of the master control setting. This is exactly what we want for these two inputs. Since they will only be used in manual mode, their function selection is irrelevant, and so the "ANY" label is used to show that any functional device will work (AND, OR, NAND etc.).

Similarly, the instructional diagram shows that the other two devices ( 18 and 19) should be selected as NOR devices since they make up the RS flip-flop itself. The wiring for these two devices follows the instructional diagram 13. As shown in the example, these two devices are jumpered to the left which indicates the "Remote" mode of operation (see FIG. 4 for labels). In the remote mode, the devices will function manually when the master control setting is on "Man", and they will function automatically when the master control is on "Auto". In other words, their mode is determined remotely by the master control. Since this is the most common mode of operation, resistor 58 (shown in FIG. 6) puts the device into "Remote" mode when no jumper is present. This provides a useful default in case the jumper is lost. A switch could avoid this problem at slightly higher cost, but the jumper solution has the advantage of allowing the teacher to "lock" devices in Remote mode by simply removing the jumpers. It also eliminates the confusion of having more than one switch on the device.

In most cases, the instructor will typically start off with the master control set to Manual operation. In this configuration. all the devices will then output whatever their local switch setting dictate. At this point the instructor can demonstrate the operation of an RS flip-flop by having the students perform their simple logic functions (two switches and two NOR gates). The students must first learn how their assigned function works. Then they can observe how their device interacts with the other devices in the system. This process demands full participation of all of the students in order to be successful, and is one of the key advantages of this instructional system.

Once the students have mastered the manual mode of operation for this circuit, the instructor can then switch the master control into automatic mode to show how the actual logic chips perform that same function in the blink of an eye. With the circuit configured as described, the master automatic mode will not affect the two input devices since they are jumpered to fully manual mode. In other words they will continue to operate as manual Set and Reset inputs to the flip-flop.

A final variation on this example will further clarify the operation and utility of the manual and automatic modes. Suppose that a given classroom has 27 students who wish to study the RS flip-flop circuit. The teacher can break them into 6 groups of 4 with a single group of three remaining. The group of three does not have enough students to complete the circuit. In this case, the teacher can still assign four devices to the group, but place one of the NOR devices into fully automatic mode via its mode selection jumper. In this configuration, the three students may manually operate their three gates, while the fourth is operated automatically as if manned by an extremely fast "ghost" student. The other 3 gates may still be switched into manual or automatic by the master control, but the jumper on the fourth board will always keep it in automatic operation.

The use of the manual and automatic modes as described above gives the system several powerful capabilities. First, it allows students to observe how their manual switching is logically equivalent to the automatic switching taking place inside the chip. When in manual mode, the students become the gates themselves. Second, the automatic capability allows the construction of systems with many more devices than available students. In the extreme case, a single student (or non-student for that matter) could build and operate an entire system by his or her self. This type of operation lends itself well to the home environment where the instructional device becomes an electronic toy that a child may use to wire his or her room, or even the entire house. Additional accessory devices could be plugged in to perform action-oriented functions like making sounds or turning on electrical outlets. Additional sensor devices could also be added to detect light or Sound and produce an output accordingly. In the home play environment. this invention becomes the electronic equivalent to the common wood and plastic building blocks that children have been using for years.

Figure 12:
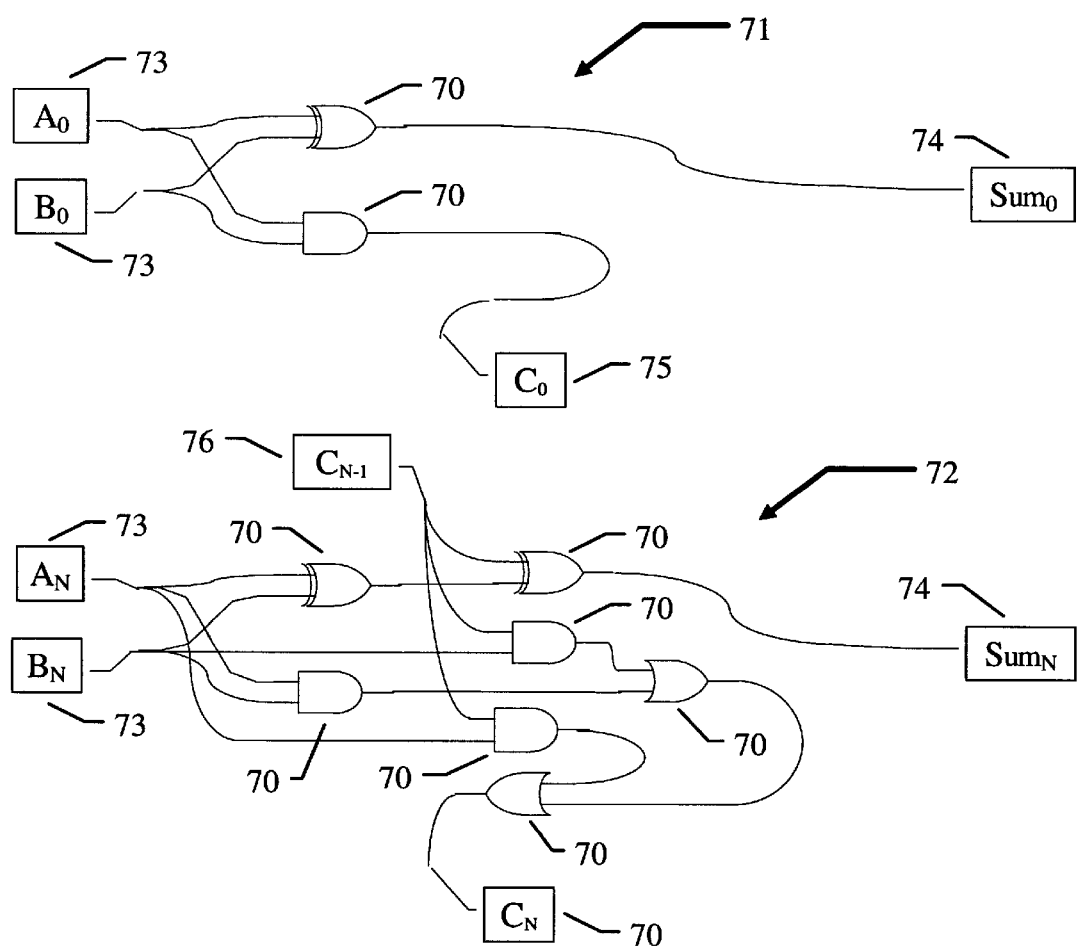
FIG. 12 shows how the learning system could be configured to teach an adder circuit.

Another operational example of the invention is the binary adder circuit shown in FIG. 12. A binary adder circuit can be implemented in many ways, but this particular example uses all AND, OR, Ad XOR gates. The adder shown in the figure is broken into two parts. The top part of the figure is labeled as 71 and shows the circuit to implement the lowest order bit of the adder. The bottom part of the figure is labeled as 72 and it shows the circuit used to implement all higher order bits. A wire between each pair of bits transmits the "carry" information and is labeled as 75 for the "carry out" and as 76 for the "carry in". All of the devices on the left side labeled as 73 are the single bit inputs for the two numbers A and B to be added. These inputs are the only devices in the circuit which are jumpered in the manual mode. All others are jumpered in remote mode for devices with students, and in auto mode for devices without students (when the class size is smaller than the circuit size). Logic devices on the right side labeled as 74 produce the summed output of the circuit. All other devices labeled as 70 perform the logic gate function indicated by their symbol (either AND, OR, or XOR). This fairly complicated circuit demonstrates another useful aspect of the invention. This circuit is complex enough that it may be difficult to track down which student is making a mistake in manual mode. In this case, the teacher could rapidly toggle the master control auto/manual switch and look for any blinking lights. Since the auto mode will compute the correct answer at each device, the toggling will flash any devices that are improperly set in the manual mode. After the students have mastered the operation of the circuit, it could be switched to automatic mode which demonstrates the speed at which computers and calculators can add numbers. While the binary inputs and outputs of the adder could be translated into decimal numbers via a look-up table written on the board they could also be decoded by special purpose devices that accept multiple inputs and display the decimal result on a large LED-type display. A similar special purpose device could convert a decimal thumbwheel input into the input bits for the two numbers to be added. Both of these special purpose devices (the decimal display and the decimal thumbwheel) are examples of the multitude of devices that fall within the scope of this patent. The adder circuit also emphasizes the usefulness of the automatic jumper mode since it is unlikely that a given class will contain exactly the right number of students to fill out an integral number of bits. In this case, the number of bits is rounded up, and the missing students are substituted by devices jumppered for automatic operation.

Several other operational circuits are worthy of brief mention. The first of these is the circle configuration where all the students form a circle with each student's output connected to the next student's input. All devices are configured for manual operation. In this conflguration, each student will act as an OR gate so that the single input can determine the output (remembering that these devices are designed for unconnected inputs to produce zero). The circle configuration operates like an electronic version of the "wave" which is practiced in stadiums throughout the world. When the input to one device turns on, the student must then turn its output on. This propagates around the circle until it reaches the beginning. Similarly, turning one device off will propagate the "off" state around the circle as well. If one of the students is instructed to operate as a NOR (instead of an OR) then the wave will propagate indefinitely as it alternates between the on and off states. This is a classic example of a feedback circuit that demonstrates how an oscillator might work. As the novelty of this demonstration wears off, the entire system could be put into automatic mode to show how fast electronic circuits can perform the same function (in the blink of an eye). The circle configuration brings up another aspect of the invention. If the system kit doesn't have enough OR chips to support this kind of a circuit in auto mode (it can always support it in manual mode since the student performs the logic), then additional manually jumpered devices could be used to supply constant inputs to the unconnected side of each non-OR device. This allows the conversion of AND and XOR devices into single input "OR" devices. While this could be done as described it would be a very wasteful use of the devices. A better solution is to provide special connectors which function as logical 1's and 0's. These special connectors are nothing more than a connector body 27 wired with either the power or ground leads fed back into the signal line providing a very low-cost input mechanism. These can also be used to turn NAND gates and XOR gates into inverters as needed (although NOR gates can perform this function without requiring the additional input). The use of these "tricks" eliminates the need for only single-input single-output inverter/buffer devices which, in turn, gives the overall kit more versatility for the same number of devices. This is one area where the jumper selectable logic devices have a slight advantage over the chip-selectable devices, since the jumper selectable devices can have a "NOT" position which simply inverts one of the inputs. In fact, it could even differentiate by providing a "NOT A" and a "NOT B" functionality.

Another circuit worthy of mention is the "Double Octopus" configuration. In this configuration, a pair of "1-to-N" wires is used. Logically, each of these 1-to-N wires has 1 input and N outputs (although as discussed earlier, all connectors on the same wire can function as either inputs or outputs). The inputs to these two wires come from two manually jumpered logic devices designated as A and B. The N outputs from the A wire are then fed into the topmost ports of N logic devices. Similarly, the N outputs from the B wire are fed into the bottom most ports of the same N logic devices. The effect of this connection arrangement is that the outputs of the two manual devices A and B are routed in parallel to each of the N devices. The instructor then controls the two manual devices to provide simultaneous input to all of the students. This is an easy way to teach all of the basic logic gates. The teacher first describes the gate functionality and then provides test inputs to the students. An "AND" gate, for example is described as: "Only turn on your switch if both the A light AND the B light are on." The teacher tries different switch positions at rates which are just fast enough for the students to keep up. In practice, this becomes an enjoyable game where the students are intensely concentrating on making the right decisions. This is usually the first circuit taught to a class, and has been demonstrated to effectively teach binary logic gates to children as young as 8 years old.

Another educationally appealing example is the construction of a vending machine coin counter. In this example, the inputs are designated as arriving from the individual detection of various coins (nickels, dimes, and quarters). When a given coin is detected (announced by the instructor), the student assigned to that coin manually switches on their device. The remainder of the students are configured as logic gates designed to combinatorically detect the correct amount. For example, the circuit might detect a total of 15 cents as the Boolean expression: (Nickel__1 AND Nickel__2 AND Nickel__3) OR (Nickel__1 AND Dime__1). As with all other examples, this one has a multitude of variations including detecting different amounts for different items and returning change if more is deposited than required for the selected purchase.

As a slight diversion from the computer-related examples, this next example illustrates the invention in a stochastic social situation which is played as a game. In this example, the output of each logic device is connected to a master summation device which tallies the number of 1's at each point in the game. Each student is told that turning on their device is like doing a day's work. In other words it costs them a day of free time and they have to invest some effort. This amount of work is given a numeric cost value of −10 to the student, but produces an overall surplus to the community of +15. Leaving their device off costs them nothing but produces no surplus either. The game will be simulated on a trial by trial basis with each trial representing a single day. Each student may optionally hide their device so that the other participants can't see what they choose to do on a given day. The only thing visible to the class is the day by day tally of how much work was done and how much surplus was produced. At the end of each "day" the teacher calculates the surplus from the number of workers and divides it by the total number of students in the class. Each student then adds this amount to their own private wealth which they keep track of themselves on a sheet of paper. The teacher plots the total surplus produced for each day. The game is simulated "day" after "day", and the results are discussed. The same game is then restarted with a slightly different set of rules. In this case each student must look up at the ceiling while making their decisions, but once all the decisions are made, they can look around at their neighbors to see what their decisions were. These results are compared with the earlier results. Finally, the game is played again such that each student can constantly observe the decisions and accumulated wealth of all other students. The students are allowed to discuss what they are going to do on the next cycle, and make deals and agreements. Again the results are compared. This simple example uses the invention as little more than an electronic "voting machine", but it suggests how it night be creatively applied to teach much more than digital logic.

The last of these Circuits to be discussed is the logical decision circuit. This circuit is first defined by a Boolean statement like: "If you do your homework and either take out the trash or clean your room you can stay up an hour later and have ice cream." This is the kind of statement that most children can relate to very well. The sentence is written on the board, dissected into its parts, and transformed into a logic circuit that may be implemented by the students. Some students are assigned to be the inputs and some to be the outputs. The remaining students perform the logic as extracted from the statement. In this circuit (and most others) it's a good idea to rotate the students so they each get a chance to be inputs, outputs, and the various logic gates.

SUMMARY, RAMIFICATIONS, AND SCOPE

Accordingly, the reader will see that the logic gate system of this invention can be both educational and entertaining. And in combining the two, it certainly provides a valuable tool for teaching about digital computer logic. The reader will also recognize that this invention defines a system of components that can be used to simulate a wide variety of non-electronic systems, and that its application is limited only by the creativity of those using it. Specifically, this invention provides a means for a group of students to actively participate in large cooperative learning situations. This invention also provides a set of building blocks that can be used by a single individual to construct interesting and educational circuits and simulations. And between these two extremes is a continuum of applications where a small number of children (or adults) can cooperate to configure a large number of devices into almost anything imaginable. Sufficient numbers of these devices could build anything from a simulated computer to a simulated neural network.

Among the many advantages of this system is its low cost. Each of the disclosed devices is constructed from very inexpensive parts. Typically the most expensive of these parts is a high-quality switch which may be purchased for only a few dollars. This low cost makes the invention commercially attractive to public and private schools which are notoriously underfunded and could not afford a computer-based version of this system even if it were available.

Although the above description contains many specificities, these should not be construed as limiting the scope of the invention but as merely providing illustrations of some of the presently preferred embodiments of this invention. In particular. the description of the invention in terms of 2-input single-output logic devices is not intended as a limitation. These devices could contain any number of inputs and outputs and perform many digital and non-digital functions. Examples include devices that simulate transistors, resistors, capacitors. random access memory, shift registers, disk drives, video displays, adders, multipliers, state machanics, Turing machines, biological neurons, fuzzy state variables, fuzzy logic gates, sensors, actuators, and even entire computer systems and networks of computer systems. These are all components that could be automatically simulated in a hardware device and manually imitated by a student who then learns both its functionality and how it interacts with other components in larger systems.

Thus the scope of the invention should be determined by the appended claims and their legal equivalents and not be limited by any examples given in this description.

I claim:

1. An educational method for teaching a plurality of persons the operation of a selected system and the operation of a plurality of different system elements of said selected system comprising the steps of:

assigning to each one of said plurality of persons an individual different one of said plurality of different system elements;

simulating the operation of each one of the assigned individual different system elements by each one of said plurality of persons;

simulating by at least two persons of said plurality of persons the combined operation of their assigned individual different system elements to teach a resulting combination thereof; and simulating by said plurality of persons the combined operation of all of said assigned individual different elements to teach the operation of said selected system.

2. The educational method of claim 1, wherein said selected system is a computational system and said system elements are computational and logic elements.

3. The educational method of claim 1, wherein said selected system is an electric circuit system and said system elements are electric circuit elements.

4. An educational apparatus for teaching a plurality of persons the operation of a selected system and the operation of a plurality of different system elements of said selected system, said apparatus comprising:

instruction means for describing the function of a selected system and the interconnection of said plurality of different system elements forming said system to a plurality of persons;

a plurality of different system elements, wherein each one of said plurality of different system elements having individual function, and each one of said plurality of individual system elements being independently operated by at least one of said plurality of said persons, so as to teach the operation of each one of said individual system elements; and a plurality of interconnection means for interconnecting said different system elements to form said system by said plurality of persons, so as to teach the operation of said selected system.

5. The educational apparatus of claim 4, wherein said selected system is a logic system and said system elements are logic elements.

6. The educational apparatus of claim 4, wherein said selected system is an electric circuit system and said system elements are electric circuit elements.

7. An educational apparatus for teaching a plurality of persons the operation of a selected logic system and the operation of a plurality of different logic elements of said selected logic system, comprising:

instruction means for describing to each one of said plurality of persons the function of said selected logic system, the function of each of said plurality of different logic elements forming said selected logic system, and the interconnection of said plurality of different logic elements forming said selected logic system;

a plurality of logic devices, each of which corresponds to one of said plurality of different logic elements of said selected logic system; wherein each of said logic devices comprises a circuit board means, connection means for exchanging power, ground, control, and logic signals with others of said plurality of different logic elements, actual circuit components as appropriate for automatically implementing the function of the logic device's corresponding logic element, actuation means for accepting manual control input from at least one of said plurality of persons being assigned to said logic device for manually implementing the function of said logic device's corresponding logic element, logic operation mode selection means for choosing between automatically implementing and manually implementing the function of said logic device's corresponding logic element, control selection means for choosing between local mode selection based on said local operation mode selection means and global mode selection based on global control signals distributed to all of said logic devices, and means for displaying the state of said logic device's corresponding logic element including the states of any input signals to said logic element and the states of any output signals from said logic element;

means for sending global control signals to all of said plurality of different logic elements;

a plurality of interconnection means for exchanging power, ground, control, and logic signals between said plurality of different logic elements; and means for supplying power and ground to said plurality of individual elements.

* * * * *